United States Patent
Kwon et al.

(10) Patent No.: US 8,023,763 B2
(45) Date of Patent: Sep. 20, 2011

(54) METHOD AND APPARATUS FOR ENHANCING IMAGE, AND IMAGE-PROCESSING SYSTEM USING THE SAME

(75) Inventors: Jae-hyun Kwon, Yongin-si (KR); Seong-deok Lee, Suwon-si (KR); Dae-su Chung, Seoul (KR); Won-hee Choe, Gyeongju-si (KR); Young-jin Yoo, Guri-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1014 days.

(21) Appl. No.: 11/907,294

(22) Filed: Oct. 10, 2007

(65) Prior Publication Data

US 2008/0317372 A1    Dec. 25, 2008

(30) Foreign Application Priority Data

Jun. 22, 2007  (KR) .................. 10-2007-0061700

(51) Int. Cl.
*G06K 9/40*    (2006.01)

(52) U.S. Cl. ....... 382/274; 382/260; 382/275; 358/3.26; 358/3.27

(58) Field of Classification Search .................. 382/260, 382/274, 275; 358/3.26, 3.27, 463
See application file for complete search history.

(56) References Cited

U.S. PATENT DOCUMENTS

| | | | | |
|---|---|---|---|---|
| 7,327,877 B2 * | 2/2008 | Kita | ............................... | 382/167 |
| 7,375,854 B2 * | 5/2008 | Hsu et al. | ........................ | 358/1.9 |
| 7,426,312 B2 * | 9/2008 | Dance et al. | .................. | 382/254 |
| 7,532,767 B2 * | 5/2009 | Oztan et al. | .................. | 382/268 |
| 7,564,438 B2 * | 7/2009 | Kao et al. | .......................... | 345/89 |
| 7,564,491 B2 * | 7/2009 | Yoneda et al. | ................ | 348/246 |
| 7,634,150 B2 * | 12/2009 | Oztan et al. | .................. | 382/268 |
| 7,636,471 B2 * | 12/2009 | Strom et al. | .................. | 382/166 |
| 2003/0189663 A1 | 10/2003 | Dolt et al. | ..................... | 348/362 |

FOREIGN PATENT DOCUMENTS

| | | |
|---|---|---|
| JP | 2004-133006 | 4/2004 |
| KR | 2001-0085699 | 9/2001 |
| KR | 10-2006-0046135 | 5/2006 |

* cited by examiner

*Primary Examiner* — Yosef Kassa
(74) *Attorney, Agent, or Firm* — Staas & Halsey LLP

(57) ABSTRACT

Provided is an apparatus and method for enhancing an image by optimizing exposure and grayscale. The apparatus includes a component-extracting unit separating luminance signals and color signals from input image signals; a luminance-enhancing unit enhancing the luminance of the luminance signals; and a contrast-enhancing unit dividing the luminance signal having the enhanced luminance into one or more local areas, and enhancing the contrast of the luminance signal having the enhanced luminance for each local area.

23 Claims, 16 Drawing Sheets

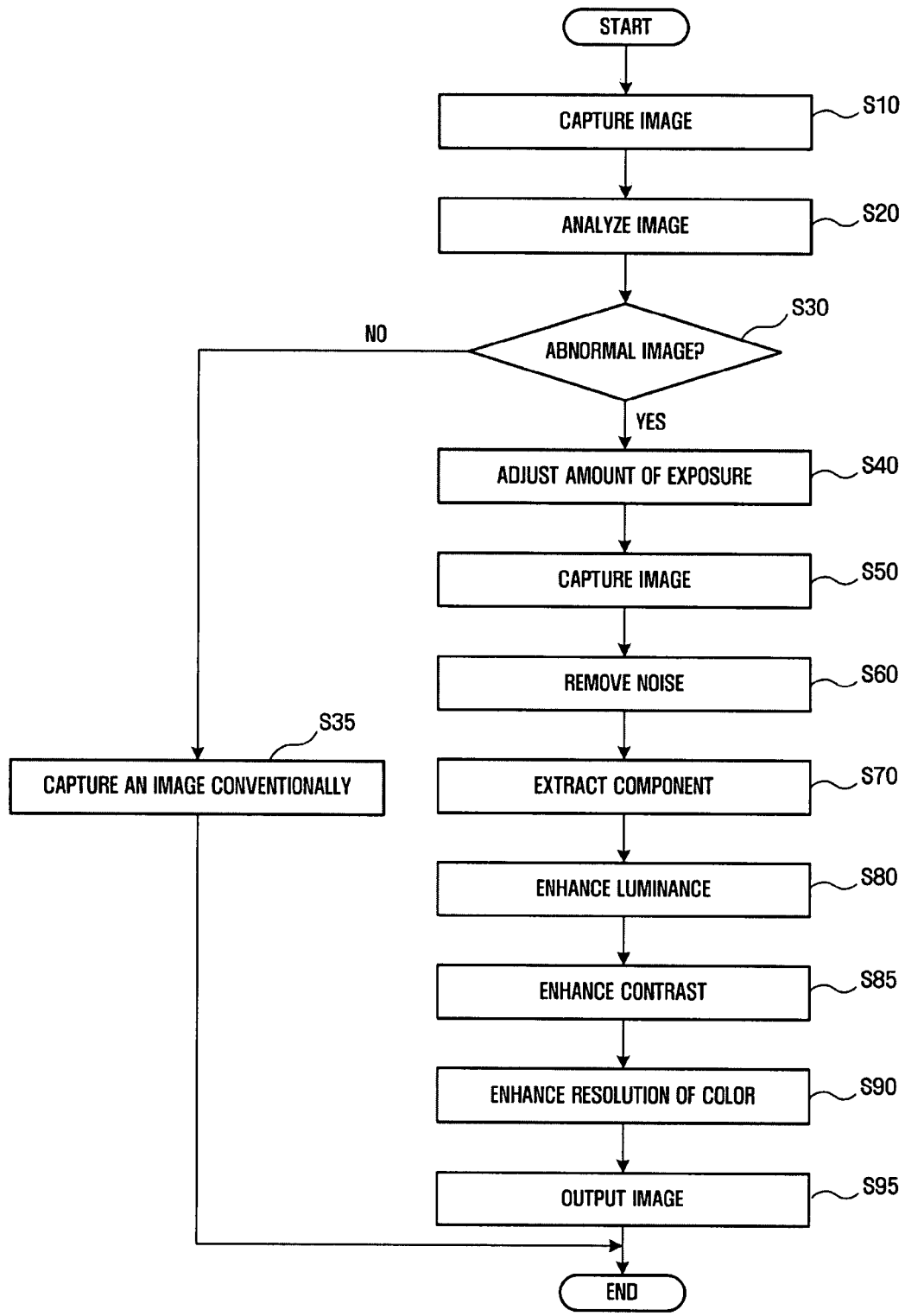

METHOD AND APPARATUS FOR ENHANCING IMAGE, AND IMAGE-PROCESSING SYSTEM USING THE SAME

CROSS REFERENCE TO RELATED APPLICATION

This application claims priority from Korean Patent Application No. 10-2007-0061700 filed on Jun. 22, 2007 in the Korean Intellectual Property Office, the disclosure of which is incorporated herein by reference in its entirety.

BACKGROUND OF THE INVENTION

1. Field of the Invention

The present invention relates to an image-processing technique, and, more particularly, to a method of enhancing an image by optimizing exposure and grayscale and to an adaptive exposure-setting method using the same.

2. Description of the Related Art

When an image-capturing apparatus, such as a digital camera, captures an image, an image area that is not covered by automatic exposure control (AE) may occur in specific environments, such as a backlit environment, a dark environment, and a high-contrast environment.

In order to solve this problem, an image-capturing method using a high dynamic range (HDR) sensor or a method of capturing a plurality of images, and combining the images has been proposed. However, the HDR sensor is difficult to design, and is costly to manufacture. In addition, the method of combining a plurality of images requires a process of determining the exposure time of each image, a process of capturing each image, and a process of combining the captured images, and thus it requires a lot of time to process image signals.

Therefore, in order to correct an image captured by a general image-capturing device to enhance the quality of the image, the following processes are needed: a process of estimating an external luminance level; a process of obtaining a sensor-response model on the basis of the estimated valve; a process of setting the exposure in consideration of post-correction to acquire an image; and a process of appropriately adjusting the luminance and contrast of the acquired image.

That is, an image-correcting technique capable of acquiring a high-resolution image using the existing image-capturing apparatus and signal-processing method is needed. This image-correcting technique can be applied to an image signal processor (ISP) that processes an image captured by an image-capturing device, such as a digital camera, or a charge coupled device (CCD) or a complementary metal oxide semiconductor (CMOS) of a camera phone.

SUMMARY OF THE INVENTION

An object of the invention is to provide an apparatus and method of enhancing the quality of an image captured by an image-capturing device.

Another object of the invention is to provide an apparatus and method of automatically changing exposure to enhance the quality of an image captured by an image-capturing device.

Objects of the present invention are not limited to those mentioned above, and other objects of the present invention will be apparent to those skilled in the art through the following description.

According to an aspect of the present invention, there is provided an apparatus for enhancing an image, the apparatus including a component-extracting unit separating luminance signals and color signals from input image signals; a luminance-enhancing unit enhancing the luminance of the luminance signals; and a contrast-enhancing unit dividing the luminance signal having the enhanced luminance into one or more local areas, and enhancing the contrast of the luminance signal having the enhanced luminance for each local area.

According to another aspect of the present invention, there is provided an image-processing system, the system including a unit acquiring an input image signal from an object; a unit determining whether the percentage of components belonging to a low-luminance area or a high-luminance area in the input image signal is higher than a threshold value, on the basis of a histogram of the input image signal; a unit controlling the input image signal acquiring unit to reduce the amount of exposure, when the percentage of the components belonging to the low-luminance area or the high-luminance area is higher than the threshold value; and an image-enhancing apparatus enhancing the luminance and local contrast of the input image signal acquired under the condition that the amount of exposure is reduced.

According to another aspect of the present invention, there is provided a method of enhancing an image, the method including separating luminance signals and color signals from input image signals; enhancing the luminance of the luminance signals; dividing the luminance signal having the enhanced luminance into one or more local areas; and enhancing the contrast of the luminance signal having the enhanced luminance for each local area.

BRIEF DESCRIPTION OF THE DRAWINGS

The above and other features and advantages of the present invention will become apparent by describing in detail preferred embodiments thereof with reference to the attached drawings in which:

FIG. 18 is a flowchart illustrating a method of enhancing an image according to an embodiment of the invention.

DESCRIPTION OF THE PREFERRED EMBODIMENTS

Figure 1:
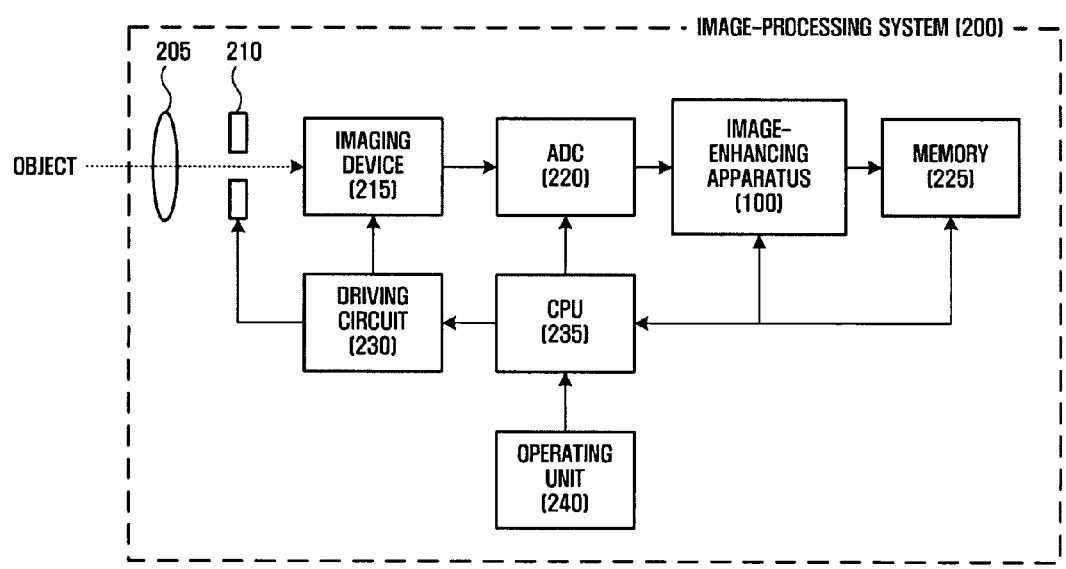
FIG. 1 is a block diagram illustrating the structure of an image-processing system according to an embodiment of the invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which preferred embodiments of the invention are shown.

FIG. 1 is a block diagram illustrating the structure of an image-processing system 200 according to an embodiment of the invention. The image-processing system 200 may include a lens 205, an iris 210, an imaging device 215, an A/D (analog-to-digital) converter 220, an image-enhancing apparatus 100, a memory 225, a driving circuit 230, a CPU (central processing unit) 235, and an operating unit 240.

Light from an object is incident on the imaging device 215 through the lens 205 and the iris 210. The imaging device 215 may be composed of a CCD, a CMOS, or other image-capturing devices known in the technical field. The A/D converter 220 converts analog signals of an image formed on an imaging surface of the imaging device 215 into digital signals. The converted digital image signals are input to the image-enhancing apparatus 100 according to the embodiment of the invention. The image-enhancing apparatus 100 processes the input image signals to enhance the quality of an output image. The image-enhancing apparatus 100 will be described in more detail below with reference to FIGS. 2, 15, and 17.

The image processed by the image-enhancing apparatus 100 is stored in the memory 225. The memory 225 may be composed of a non-volatile memory device, such as a ROM (read only memory), a PROM (programmable read only memory), an EPROM (erasable programmable read only memory), and an EEPROM (electrically erasable programmable read only memory), or a flash memory, a volatile memory devices, such as a RAM (random access memory), or a storage medium, such as a hard disk or an optical disk.

Meanwhile, signals are input to the CPU 235 for controlling the system through the operating unit 240, and control signals are transmitted from the CPU 235 to the image-enhancing apparatus 100 or the memory 225, so that the recording of the image processed by the image-enhancing apparatus 100 is controlled. At the same time, the CPU 235 determines the amount of exposure on the basis of the kind of input images received from the image-enhancing apparatus 100, and the control signal corresponding to the determined amount of exposure is input to the driving circuit 230 for adjusting the iris 210, the exposure time (shutter speed) of the imaging device 215, or auto gain control (AGC).

Figure 2:
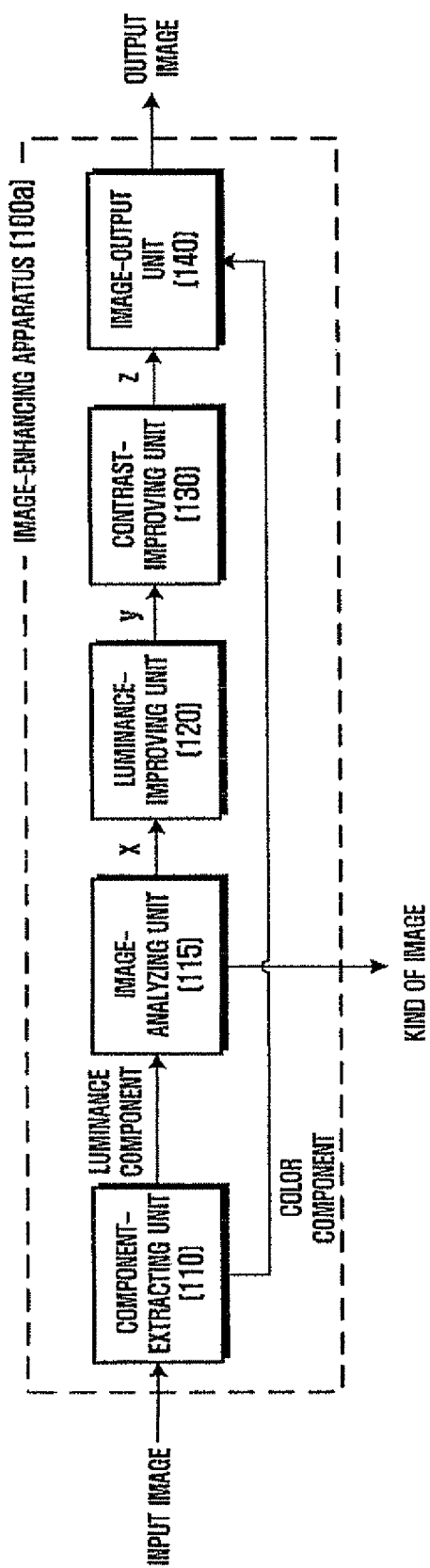
FIG. 2 is a block diagram illustrating the structure of an apparatus for enhancing an image according to an embodiment of the invention.
Figure 15:
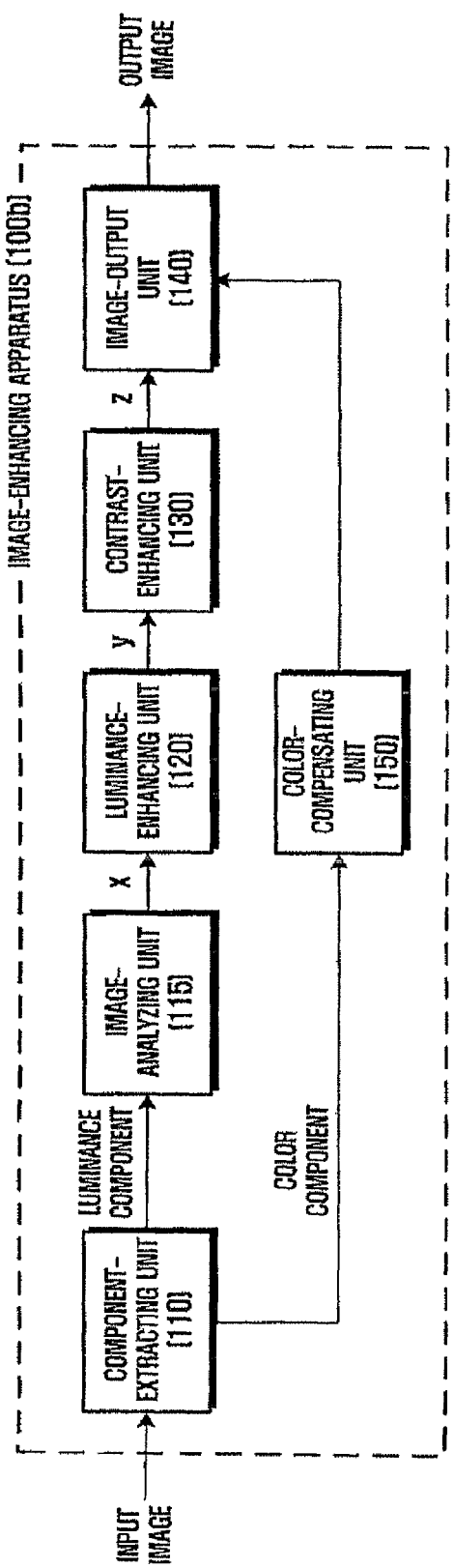
FIG. 15 is a block diagram illustrating the structure of an apparatus for enhancing an image according to another embodiment of the invention.
Figure 17:
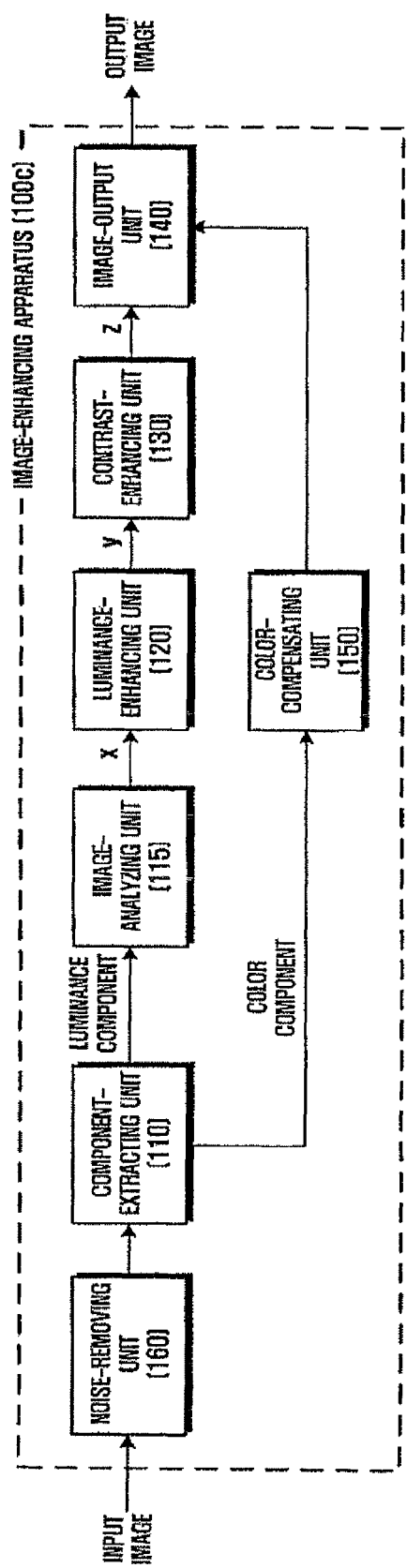
FIG. 17 is a block diagram illustrating the structure of an apparatus for enhancing an image according to still another embodiment of the invention.

FIGS. 2, 15, and 17 are block diagrams illustrating the structures of image-enhancing apparatuses 100a to 100c according to embodiments of the invention, respectively. The image-enhancing apparatus 100a shown in FIG. 2 includes a component-extracting unit 110, an image-analyzing unit 115, a luminance-enhancing unit 120, a contrast-enhancing unit 130, and an image-output unit 140.

The component-extracting unit 110 separates an input image into a luminance signal (a luminance component) and a color signal (a color component). For example, when an input image is composed of R, G, and B signals, the component-extracting unit 110 separates the R, G, and B signals into luminance signals and color signals, that is, HSV signals, YUV signals, YCbCr signals or YIQ signals. In the following description, HSV signals are used.

Figure 3:
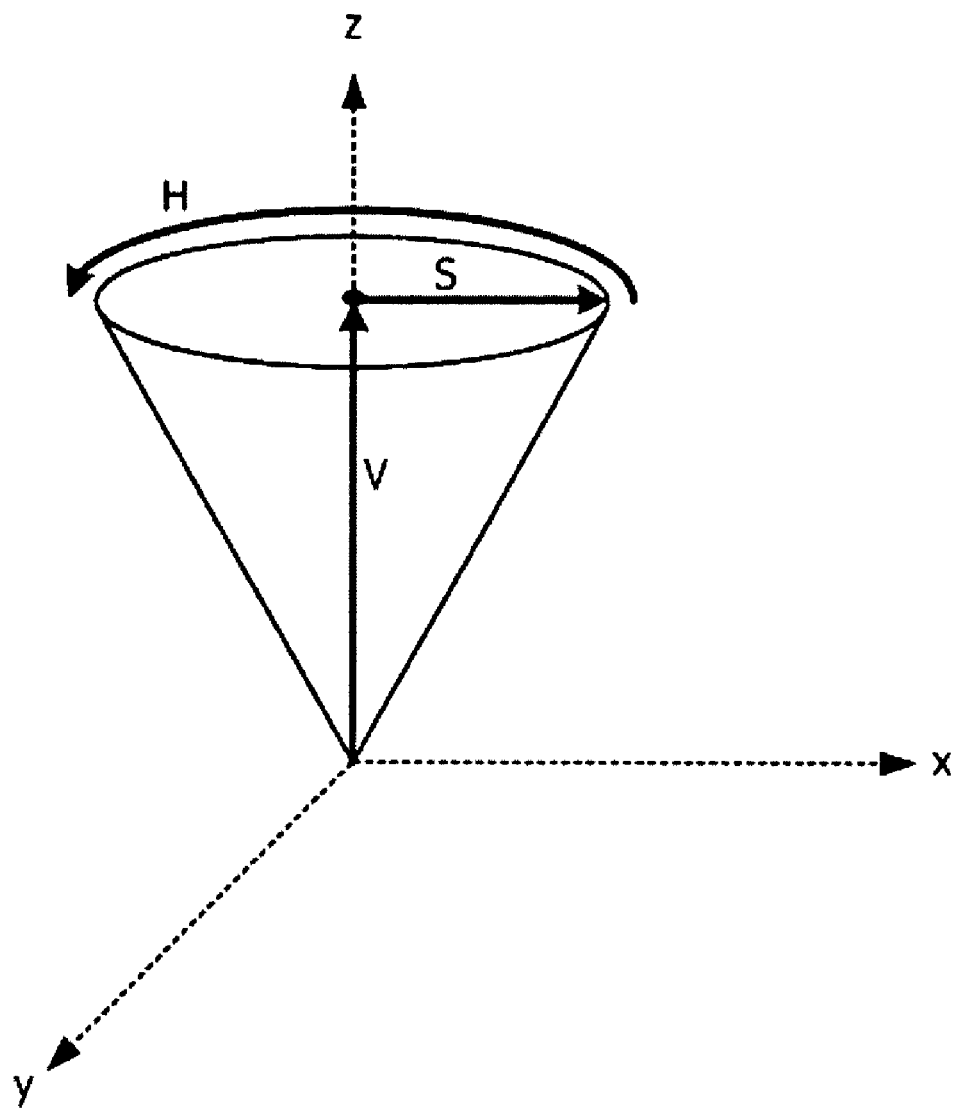
FIG. 3 is a diagram illustrating a method of representing components in an HSV color space.

FIG. 3 is a diagram illustrating a method of displaying components H (hue), S (saturation), and V (value) in the HSV color space. V denotes a component indicating luminance, H denotes a component indicating the kind of color (hue), and S denotes a component indicating chroma. In FIG. 3, V indicates a value on the z axis, S indicates a radius from the z axis, and H indicates an angle from the x-axis in the clockwise direction.

The image-analyzing unit 115 analyzes characteristics of an image using the luminance signal among the signals extracted by the component-extracting unit 110.

Specifically, the image-analyzing unit 115 calculates a histogram of the luminance signals of all of the input images or an image extracted by random sampling, and determines whether the percentage of components belonging to a low-luminance area or a high-luminance area is higher than a threshold value in the input image, on the basis of the histogram. A separate image-correcting process is not performed on the image in which the percentage of the components belonging to the low-luminance area or the percentage of the components belonging to the high-luminance area is lower than the threshold value (the image is referred to as a normal image).

However, when the dynamic range of the image is wider than the dynamic range that can be acquired by the imaging device 215 or when the luminance of the image is excessively high, an area in which exact image information is not acquired due to the saturation of pixels is generated. In order to solve this problem, in this embodiment, an adaptive exposure setting process considering subsequent correction and an image-correcting process are performed on the image in which the percentage of the components belonging to the low-luminance area or the percentage of the components belonging to the high-luminance area is higher than the threshold value (the image is referred to as an abnormal image).

Figure 4:
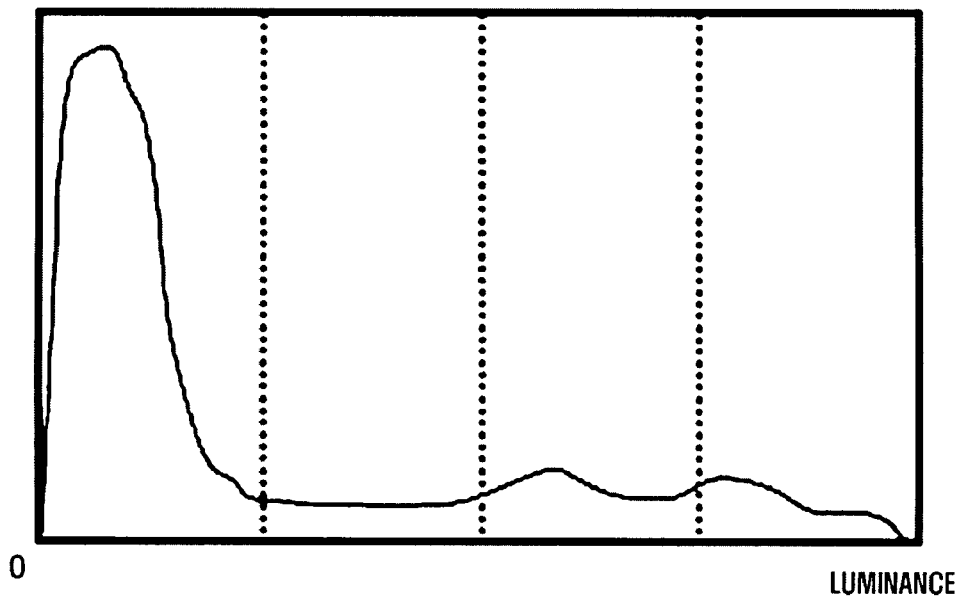
FIG. 4 is a diagram illustrating a histogram of an image having a large number of components belonging to a low-luminance area.
Figure 5:
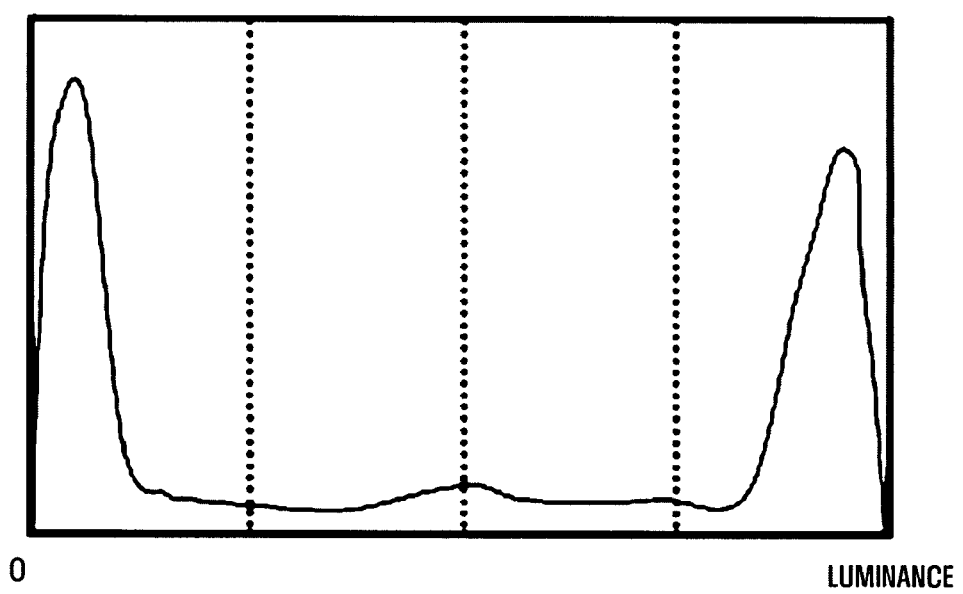
FIG. 5 is a diagram illustrating a histogram of an image having a large number of components belonging to a low-luminance area and a high-luminance area.

For example, in the image having the histogram shown in FIG. 4, details of the low-luminance area need to be restored. In the case of a high-contrast image shown in FIG. 5, details of the low-luminance area and the high-luminance area need to be restored. In FIGS. 4 and 5, the horizontal axis indicates the dynamic range of a luminance signal, and the vertical axis indicates a probability density function of the luminance signal or the count thereof.

The image-analyzing unit 115 determines the kind of input image, that is, whether an input image is a normal image or an abnormal image. When it is determined that an input image is a normal image, the image-processing system 200 performs general automatic exposure. When it is determined that an input image is an abnormal image, the image-processing system 200 reduces the degree of exposure by a specific value, and performs an image-correcting process on the input image.

Referring to FIG. 1, the CPU 235 determines the degree of exposure on the basis of the kind of input image provided from the image-enhancing apparatus 100. In order to perform this process, the CPU 235 predicts an external luminance level, and sets exposure on the basis of a sensor-response model based on the predicted value. For example, the external luminance level is defined as the average of luminance signals of the input image.

Figure 6:
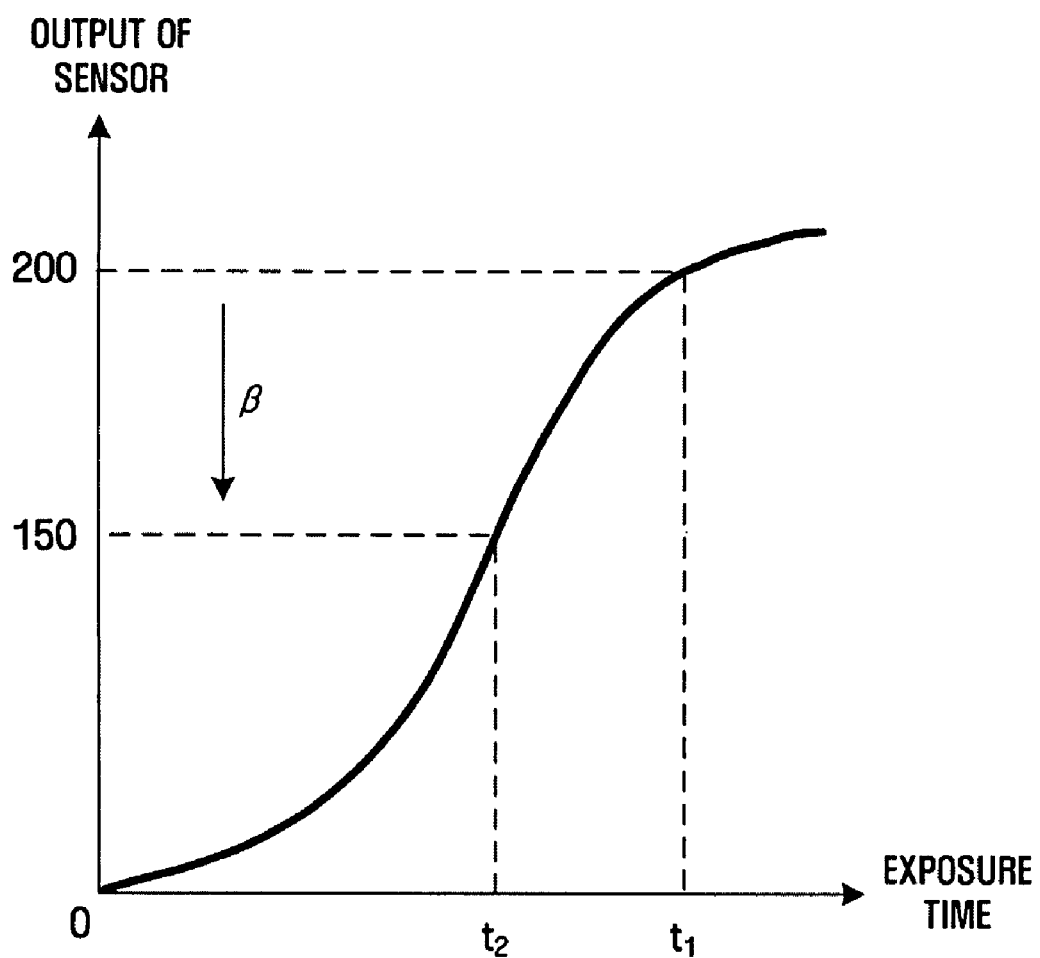
FIG. 6 is a graph illustrating the relationship between the output of a sensor and an exposure time according to a sensor-response model.

As shown in FIG. 6, the sensor-response model indicates the relationship between an exposure time and the output of the sensor of the imaging device 215, which can be experimentally calculated or obtained from specification information of the sensor. For example, assuming that the output of the sensor (the average output of all of the images) is 200 when the current exposure time is $t_1$, and an output ($\beta$) to be reduced is 50, an exposure time $t_2$ required to obtain a target output of 150 can be calculated from the sensor-response model.

Therefore, the CPU 235 uses the sensor-response model to determine the degree of exposure, such as an exposure time and a shutter speed, and provides a control signal corresponding to the determined exposure to the iris 210 or the imaging device 215.

In the abnormal image, when the degree of exposure is reduced, the overall luminance of the image is lowered. As a result, a saturated high-luminance grayscale is somewhat restored, but the low-luminance area becomes dark. Therefore, in this case, a separate post-process needs to be performed.

The luminance-enhancing unit 120 enhances the luminance of the low-luminance area on the basis of a cumulative distribution function (CDF) of the image. Specifically, the luminance-enhancing unit 120 sets one or more luminance values $D_1$ to $D_m$ in the low-luminance area in a cumulative histogram shown in FIG. 7, and calculates the CDF values of the luminance values. Then, the luminance-enhancing unit 120 calculates a luminance-correction parameter $\delta$ using Expression 1:

$$\delta = w_{D1} f(D_1) + w_{D2} f(D_2) + \ldots + w_{Dm} f(D_m) \quad (1)$$

where $w_{D1}$ to $w_{Dm}$ indicate weights for set luminance values, and f(Dm) indicates a CDF value of the luminance value $D_m$.

Preferably, the smaller the luminance value becomes, the larger the weight becomes.

Figure 7:
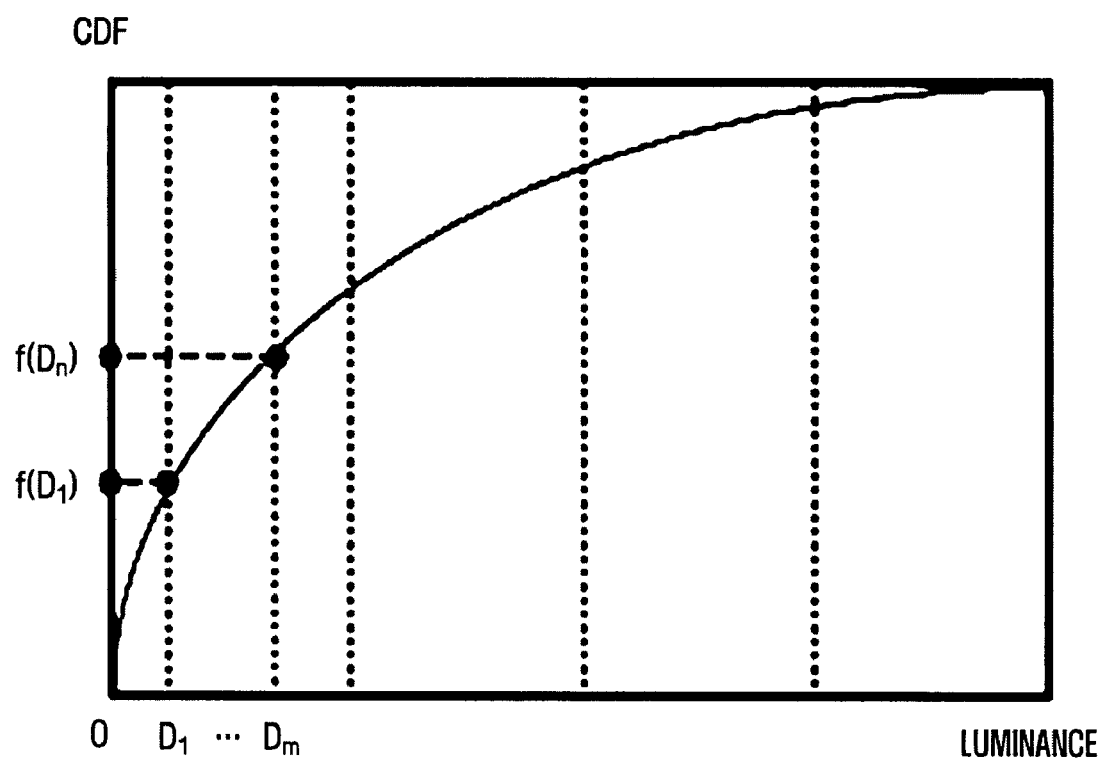
FIG. 7 is a diagram illustrating a cumulative histogram of an image.

As shown in FIG. 7, the luminance-correction parameter $\delta$ becomes larger as the number of pixels in the low-luminance area increases. That is, when the luminance-correction parameter $\delta$ is large, it is necessary to considerably increase the luminance of the low-luminance area in the abnormal image.

A process of correcting the luminance of an input image using the luminance-correction parameter $\delta$ can be performed by Expression 2:

$$y = \frac{\log\left[\frac{x+\delta}{\delta}\right]}{\log\left[\frac{1+\delta}{\delta}\right]}, \quad (2)$$

wherein x indicates the luminance of an image input to the luminance-enhancing unit 120, and y indicates the luminance of an image output from the luminance-enhancing unit 120, that is, the corrected luminance.

Figure 8:
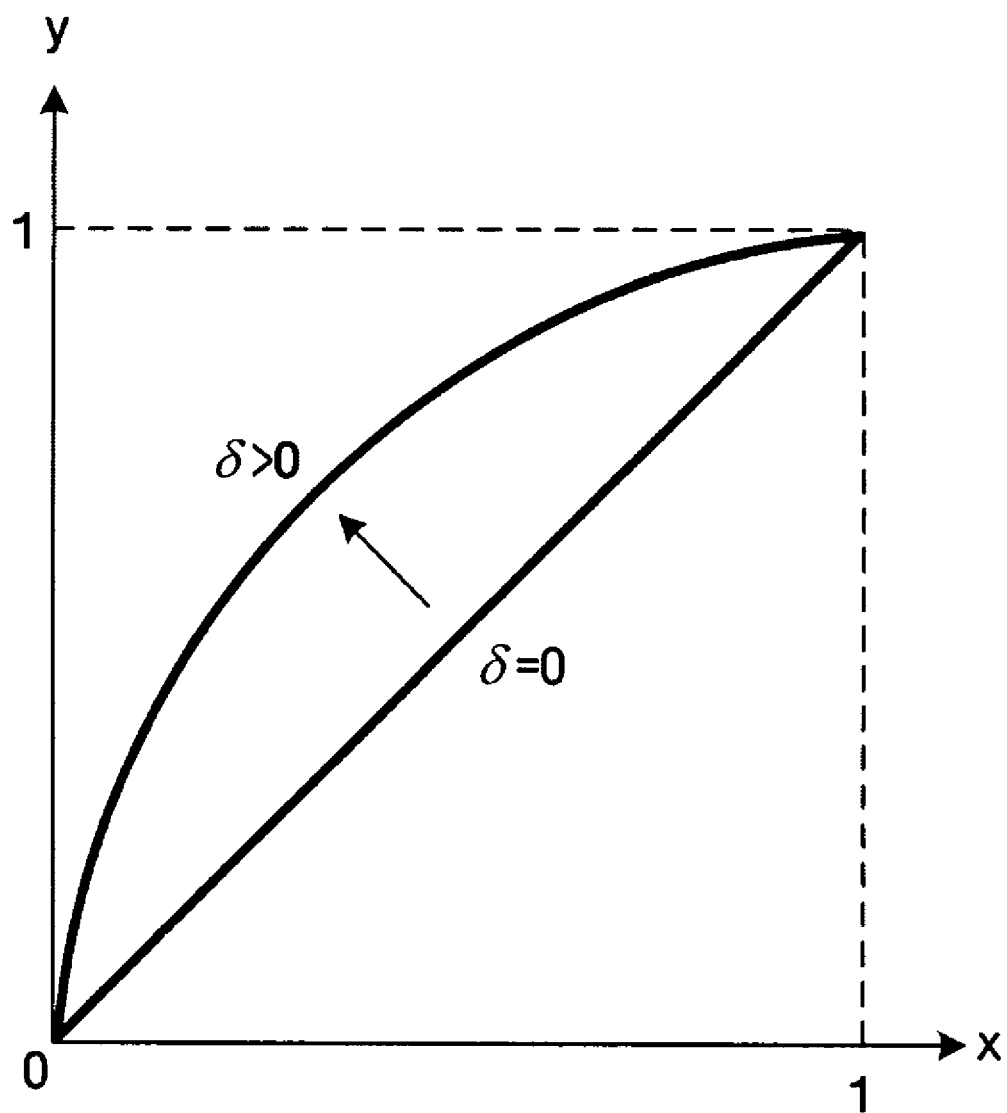
FIG. 8 is a diagram illustrating the result of a process of correcting luminance using a luminance-correction parameter.

Expression 2 can be represented as in FIG. 8. In FIG. 8, x and y are each normalized between 0 and 1. If the luminance-correction parameter $\delta$ is 0, luminance correction is not performed, so that x, which is the luminance of an input image, is equal to y, which is the luminance of an output image. However, as the luminance-correction parameter $\delta$ increases, the amount of luminance correction increases. However, x and y indicating the luminance of an input image and the luminance of an output image, respectively, have the same value at both end points (when x is 0 or 1), regardless of the luminance-correction parameter $\delta$.

However, it is difficult to obtain a natural image by correcting only the luminance of the low-luminance area. Therefore, it is necessary to correct local contrast in addition to correcting the luminance of the low-luminance area.

Therefore, the luminance-enhancing unit 120 divides the overall dynamic range into a plurality of local areas, and applies contrast-enhancing functions to the divided local areas. A linear function shown in FIG. 9 may be used as the contrast-enhancing function. For example, the contrast-enhancing function is defined by Expression:

$$R_k = \begin{cases} R_{k,left} = \dfrac{y}{P_k}, & \text{if } y < P_k \\ R_{k,right} = \dfrac{1-y}{1-P_k}, & \text{if } y \geq P_k \end{cases} \quad (3)$$

Figure 9:
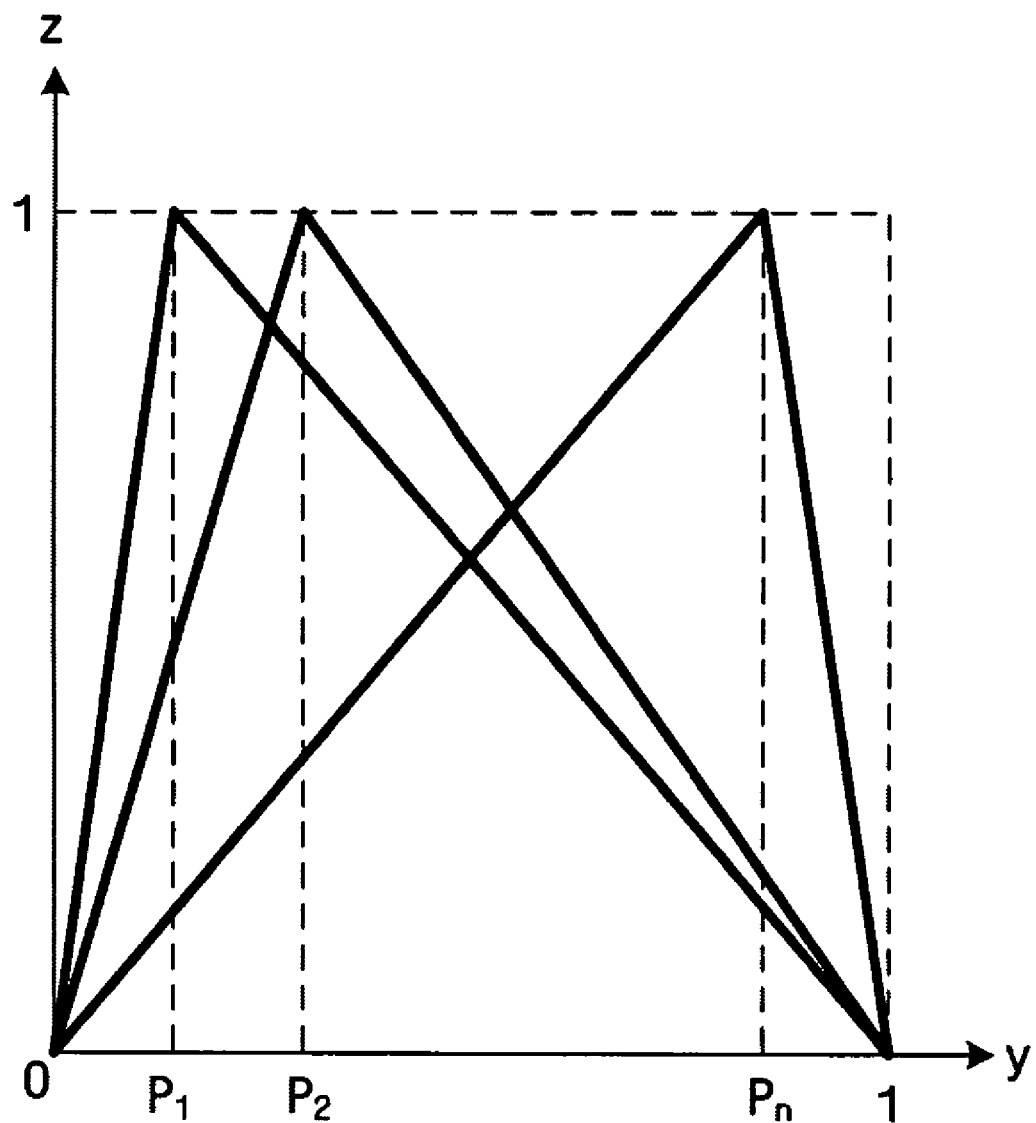
FIG. 9 is a diagram illustrating a linear function used as an example of a contrast-enhancing function.

In FIG. 9, the horizontal axis indicates the output y of the luminance-enhancing unit, and the vertical axis indicates the enhanced result z of contrast. Of course, y and z are normalized values. In addition, $P_n$ indicates a luminance value disposed the boundary between the plurality of divided local areas. The number of $P_n$ and the intervals between $P_n$ can be arbitrarily determined. Preferably, the number of $P_n$ is in the range of 3 to 7, and the intervals between $P_n$ are equal to each other.

In Expression 3, $R_{k,left}$ is used to enhance the contrast of a dark area, and $R_{k,right}$ is used to enhance the contrast of a right area.

Figure 10:
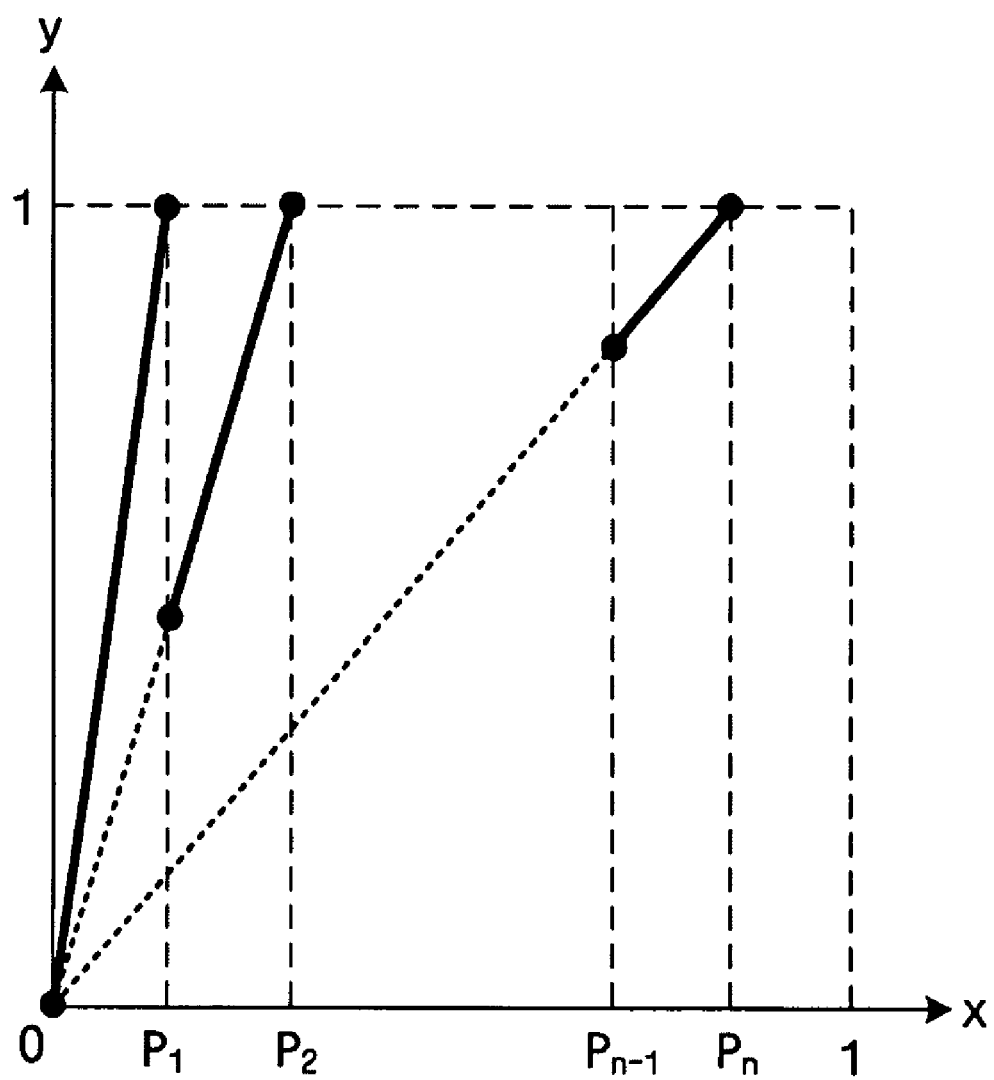
FIG. 10 is a diagram illustrating a left contrast-enhancing function for each local area.

In general, when a left contrast-enhancing function applied between $P_{k-1}$ and $P_k$ is defined as $R_{k,left}$, FIG. 10 is a graph illustrating $R_{k,left}$ divided into a plurality of areas. As can be seen from FIG. 10, the left contrast-enhancing function is not applied to the rightmost local area among n+1 local areas.

Figure 11:
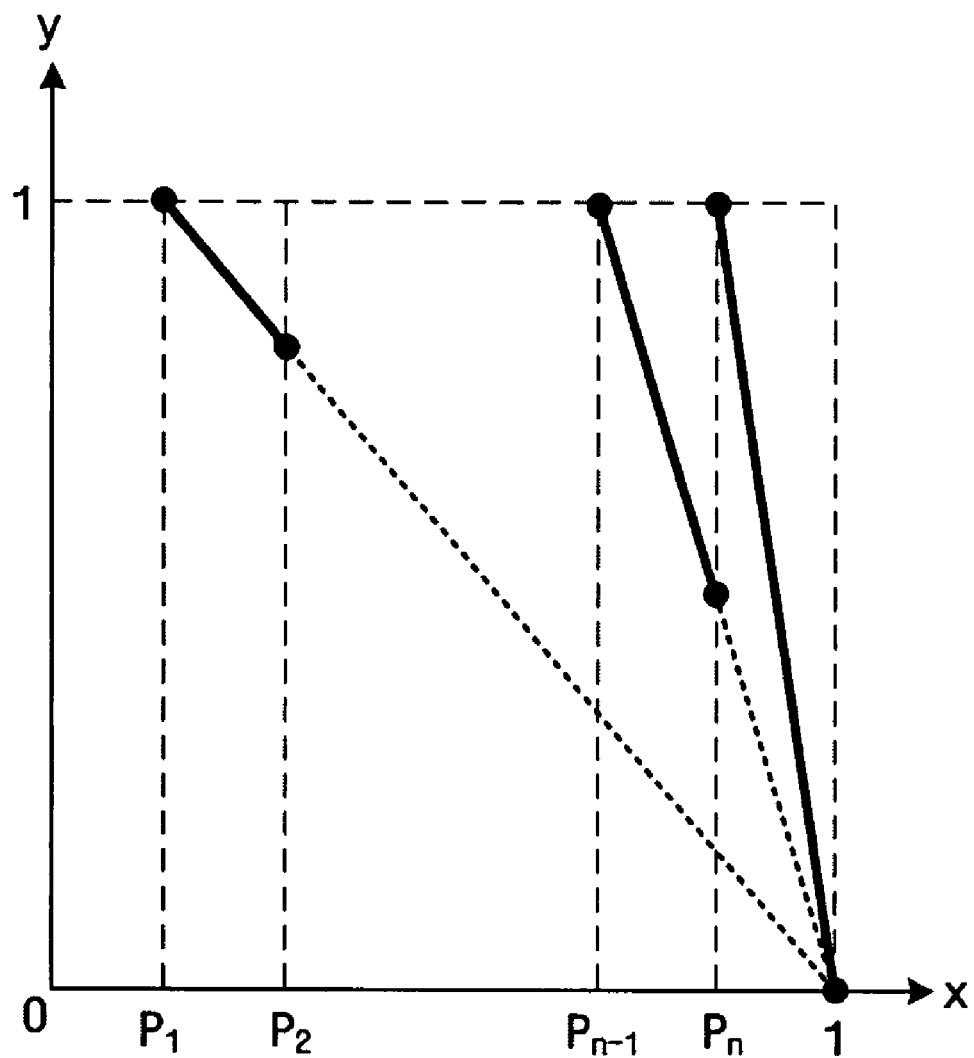
FIG. 11 is a diagram illustrating a right contrast-enhancing function for each local area.

Meanwhile, when a right contrast-enhancing function applied between $P_k$ and $P_{k+1}$ is defined as $R_{k,right}$, FIG. 11 is a graph illustrating $R_{k,right}$ divided into a plurality of areas. As can be seen from FIG. 11, the left contrast-enhancing function is not applied to the leftmost local area among n+1 local areas.

However, when the contrast of the image increases in each local area, artifact or a boundary effect is more likely to occur at the boundaries between the local areas. Therefore, it is necessary to apply a smoothing function to remove the artifact or the boundary effect.

For example, a smoothing function S applied to the left contrast-enhancing function can be defined by Expression 4:

$$S = 1 - P_{n-1}, \text{if } P_{n-1} \leq y \leq P_n \quad (4)$$

Figure 12:
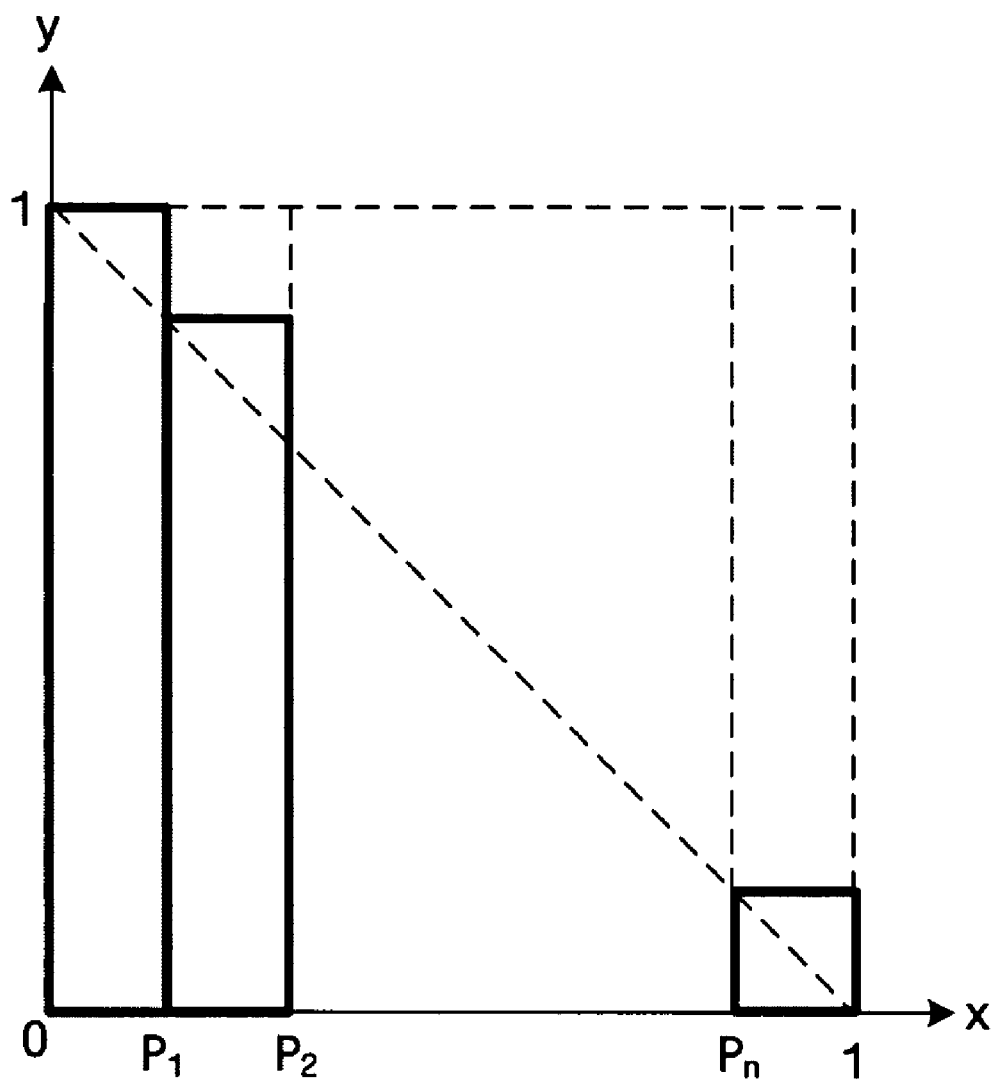
FIG. 12 is a diagram illustrating an example of a smoothing function.

As shown in FIG. 12, the smoothing function S has a specific level for each local area. That is, the smoothing function S means an image obtained by performing sub-sampling on an input image. The contrast-enhancing unit 130 obtains a final smoothing function $S_{LPF}$ by applying a low pass filter or an interpolation filter to the smoothing function S.

The contrast-enhancing unit 130 multiplies the left contrast-enhancing function by the final smoothing function $S_{LPF}$ to obtain an increased correction amount $R_{shadow}$ for a dark area. The increased correction amount $R_{shadow}$ is represented by Expression 5:

$$R_{shadow} = (R_{1,left} \cdot sw_1 + R_{2,left} \cdot sw_2 + \ldots + R_{n,left} \cdot sw_n) \cdot S_{LPF}, \quad (5)$$

where $sw_n$ indicates a weight for each local area.

Figure 13:
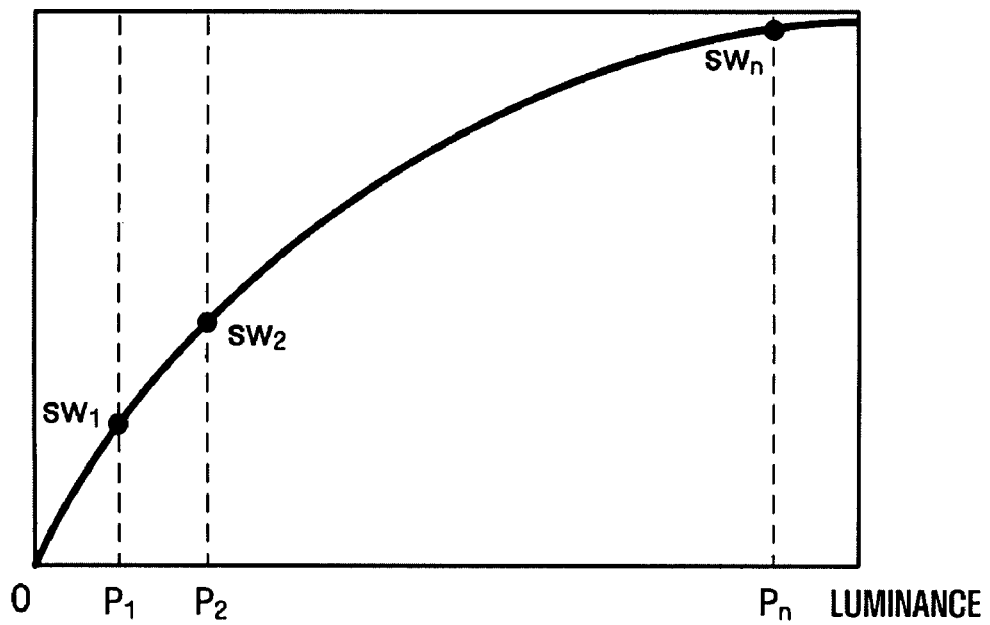
FIGS. 13 and 14 are diagrams illustrating a method of determining a weight value $sw_n$.
Figure 14:
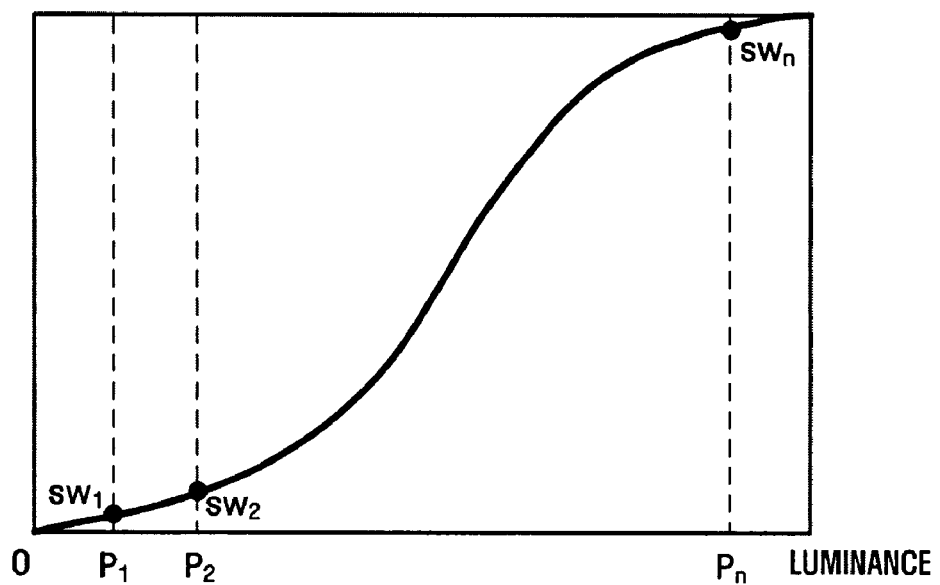

However, in an image having a lot of pixels belonging to the low-luminance area, as shown in FIG. 13, as input luminance increases, a CDF value rapidly increases. In contrast, in an image having few pixels belonging to the low-luminance area, as shown in FIG. 14, as input luminance increases, a CDF value increases slowly. Therefore, when $sw_n$ is defined as the gradient of the CDF at the boundary between the local areas, $sw_n$ can be adaptively selected according to characteristics of an image. That is, as an image has a larger number of pixels belonging to the low-luminance area, a weight becomes larger in the low-luminance area.

Meanwhile, the final smoothing function applied to the right contrast-enhancing function should be reverse to the final smoothing function applied to the left contrast-enhancing function, that is, $1 - S_{LPF}$. Therefore, an increased correction amount $R_{highlight}$ for a bright area can be represented by Expression 6:

$$R_{highlight} = (R_{1,right} \cdot hw_1 + R_{2,right} \cdot hw_2 + \ldots + R_{n,right} \cdot hw_n) \cdot (1 - S_{LPF}), \quad (6)$$

where $hw_n$ indicates another weight for each local area.

In this case, preferably, $hw_n$ is the reciprocal of $sw_n$. Therefore, $hw_n$ is defined as $1 - sw_n$ or $1/sw_n$.

The contrast-enhancing unit 130 adds $R_{shadow}$ to the luminance y output from the luminance-enhancing unit 120, and subtracts the luminance y from $R_{highlight}$ to calculate the corrected result by using Expression 7:

$$R_{mix} = y + R_{shadow} - R_{highlight}. \quad (7)$$

In Expression 7, $R_{shadow}$ is added to enhance the luminance of a dark area, and $R_{highlight}$ is subtracted to lower the luminance of a bright area. In this embodiment, $R_{shadow}$ and $R_{highlight}$ are both used, but the invention is not limited thereto. One of $R_{shadow}$ and $R_{highlight}$ may be used according to the purpose of image correction.

The final output luminance z output from the contract-enhancing unit 130 can be calculated by Expression 8 to adjust the reflection ratio of $R_{mix}$:

$$z = (1-\alpha) \cdot y + \alpha \cdot R_{mix}, \quad (8)$$

where α is a coefficient indicating the ratio of $R_{mix}$ applied. As the value of α increases, the reflection ratio of $R_{mix}$ becomes larger. The value of a is preferably set in proportional to the output β to be reduced. This is because, when the output of the sensor is reduced by β in order to restore the high-luminance area, the luminance of the low-luminance area is also reduced by β.

The luminance signal z finally corrected by the contrast-enhancing unit 130 is transmitted to the image-output unit 140. The image-output unit 140 combines the luminance signal z with a color signal extracted by the component-extracting unit 110 to form a final output image. The combining process includes a process of converting a signal having luminance and a color separated from each other, such as an HSV signal, a YUV signal, a YCbCr signal, or a YIQ signal, into an RGB signal.

FIGS. 15 and 17 are block diagrams illustrating the structures of image-enhancing apparatuses 100b and 100c, respectively, according to embodiments of the invention.

The image-enhancing apparatus 100b differs from the image-enhancing apparatus 100a shown in FIG. 2 in that a color-compensating unit 150 is additionally provided. The luminance signal is corrected by the luminance enhancement and the contrast enhancement, but it is necessary to compensate for a color signal (exactly, the saturation of a color) in addition to enhancing the luminance and the contrast, in order to restore color information peculiar to the image to obtain the same color stimulation as the human eye.

When the component-extracting unit 110 separates an HSV signal from an input image, the color-compensating unit 150 compensates for a saturation signal S with a hue signal H being fixed. This is because it seems that an artifact has occurred in an area of the image in which hue varies or there is increased color noise in the area.

Figure 16:
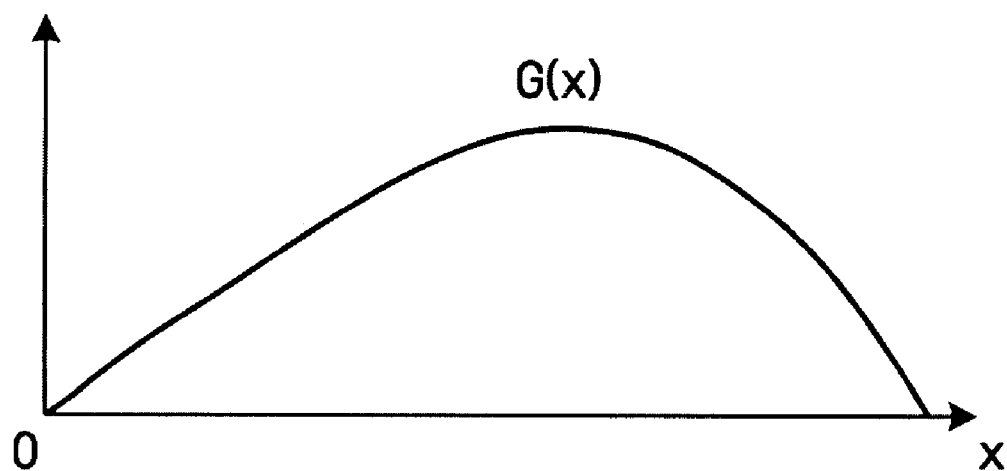
FIG. 16 is a diagram illustrating an example of a saturation function considering the sensitivity of the human eye.

The color-compensating unit 150 can collectively increase input saturation signals, but it can effectively adjust saturation signals using a saturation function shown in FIG. 16, in consideration of characteristics of the human eye. An increased final saturation signal s' can be calculated by Expression 9:

$$s' = s + \alpha \cdot G(x), \quad (9)$$

where s indicates a saturation signal input to the color-compensating unit 150, α is a coefficient indicating the reflection ratio used in Expression 8, G(x) indicates a saturation function, and x indicates an input luminance signal.

The color signal compensated by the color-compensating unit 150 is transmitted to the image-output unit 140.

The image-enhancing apparatus 100c shown in FIG. 17 differs from the image-enhancing apparatus 100b shown in FIG. 15 in that a noise-removing unit 150 for removing noise from an input image is additionally provided.

A trade-off relationship is established between the enhancement of the low-luminance area and an increase in noise. Therefore, when a process of enhancing the luminance of the low-luminance area is performed on an image that is captured at a short exposure time, low-luminance noise may cause problems. Therefore, the noise-removing unit 160 for removing noise from an input unit is needed.

Specifically, the noise-removing unit 160 estimates a noise level for each channel with respect to an AGC (automatic gain control) level used in an exposure control algorithm, and removes or reduces noise of each pixel on the basis of a noise standard deviation according to the pixel value in a predetermined mask and the average of the estimated noise levels. Of course, a noise removing technique according to the related art may be used to remove noise from an image.

The components shown in FIGS. 2, 15, and 17 may be software components, such as tasks, classes, sub-routines, processes, objects, execution threads, and programs, hardware components, such as a field-programmable gate array (FPGA) and an application specific integrated circuit (ASIC), or combinations of the software components and the hardware components. The components may be stored in a computer-readable storage medium, or they may be dispersed in a plurality of computers.

FIG. 18 is a flowchart illustrating a method of enhancing an image according to an embodiment of the invention.

First, the imaging device 215 captures input image signals or sampled input image signals from an object, that is, preview image signals S10.

Then, the image-analyzing unit 115 analyzes the input image on the basis of a histogram of the input image signals S20, and determines whether the input image is an abnormal image, that is, whether the percentage of components belonging to a low-luminance area or a high-luminance area is higher than a threshold value S30.

When the input image is a normal image, that is, the percentage of components belonging to the low-luminance area or the high-luminance area is lower than the threshold value (S30; No), a general image-capturing method according to the related art is used to capture an image and generate a final output image S35.

When the input image is an abnormal image (S30; Yes), the CPU 235 controls the driving circuit 230 to reduce the amount of exposure by a predetermined value S30. The imaging device 215 captures input image signals again under the low-exposure condition S50.

Then, the image-enhancing apparatus 100 enhances the luminance and local contrast of the input image signals captured under the low-exposure condition (S60 to S90).

The operation of the image-enhancing apparatus 100 will be described in detail below.

The noise-removing unit 160 removes noise from the captured input image signals S60.

The component-extracting unit 110 separates luminance signals and color signals from the noise-free input image signals S70.

The luminance-enhancing unit 120 enhances the luminance of the luminance signals, particularly, the luminance of the luminance signals belonging to a low-luminance area S80. Specifically, the luminance-enhancing unit 120 calculates a luminance-correction parameter from the sum of weights of CDF values corresponding to the luminance values set in the low-luminance area, and enhances the luminance of the separated luminance signals on the basis of the calculated luminance-correction parameter.

The contrast-enhancing unit 130 divides the luminance signal having enhanced luminance into one or more local areas, and enhances the contrast of the luminance signal having enhanced luminance in each local area S85.

Specifically, the contrast-enhancing unit 130 applies a contrast-enhancing function (for example, a linear function) to the local areas of the luminance signal, and applies a smoothing function to the result obtained by the contrast-enhancing function. For example, the smoothing function is obtained by performing low pass filtering on a function having a specific level for each local area.

The control-compensating unit 150 enhances the resolution of the separated color signals whose luminance and contrast have been enhanced S90. In this case, it is preferable that the color-compensating unit 150 enhance the resolution of only a saturation signal among the color signals.

Finally, the image-output unit 140 combines the luminance components having enhanced luminance and contrast with the compensated color signals to form a final output image S95.

According to the above-described embodiments of the invention, it is possible to adaptively perform image processing according to the kind of input image. In particular, it is possible to enhance the quality of an image in which the percentage of components belonging to a low-luminance area or a high-luminance area is high, and reduce artifacts.

Although the embodiments of the invention have been described above with reference to the accompanying drawings, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. An apparatus for enhancing an image, comprising:
   a component-extracting unit separating luminance signals and color signals from input image signals;
   a luminance-enhancing unit enhancing the luminance of the luminance signals; and
   a contrast-enhancing unit dividing the luminance signal having the enhanced luminance into one or more local areas, and enhancing the contrast of the luminance signal having the enhanced luminance for each local area.

2. The apparatus of claim 1, wherein the luminance-enhancing unit enhances the luminance of the luminance signal belonging to a low-luminance area.

3. The apparatus of claim 2, wherein the luminance-enhancing unit calculates a luminance-correction parameter on the basis of the sum of CDF (cumulative distribution function) values corresponding to luminance values that are set in the low-luminance area, and enhances the luminance of the separated luminance signals on the basis of the luminance-correction parameter.

4. The apparatus of claim 1, wherein the contract-enhancing unit applies a contrast-enhancing function, which is a linear function, to the luminance signal for each local area, and applies a smoothing function to the result obtained by the contrast-enhancing function.

5. The apparatus of claim 4, wherein the smoothing function is obtained by performing low pass filtering on a function having only a specific level value for each local area.

6. The apparatus of claim 4, wherein the contrast-enhancing function is composed of a left contrast-enhancing function and a right contrast-enhancing function.

7. The apparatus of claim 1, further comprising:
   an image-analyzing unit determining whether the percentage of components belonging to a low-luminance area or a high-luminance area in the input image is higher than a threshold value on the basis of a histogram of the separated luminance signals.

8. The apparatus of claim 1, further comprising:
   a noise-removing unit reducing or removing noise from the input image signal.

9. The apparatus of claim 1, further comprising:
   a color-compensating unit enhancing the resolution of the separated color signals whose luminance and contrast are enhanced.

10. The apparatus of claim 9, wherein the color-compensating unit enhances the resolution of only a saturation signal among the color signals.

11. An image-processing system comprising:
    a unit acquiring an input image signal from an object;
    a unit determining whether the percentage of components belonging to a low-luminance area or a high-luminance area in the input image signal is higher than a threshold value, on the basis of a histogram of the input image signal;
    a unit controlling the input image signal acquiring unit to reduce the amount of exposure, when the percentage of the components belonging to the low-luminance area or the high-luminance area is higher than the threshold value; and an image-enhancing apparatus enhancing the luminance and local contrast of the input image signal acquired under the condition that the amount of exposure is reduced.

12. The image-processing system of claim 11, wherein the amount of exposure is reduced by adjusting an iris and a shutter speed or by performing auto gain control (AGC).

13. The image-processing system of claim 11, wherein:
the image-enhancing apparatus comprises:
a component-extracting unit separating luminance signals and color signals from the acquired input image signals;
a luminance-enhancing unit enhancing the luminance of the luminance signals; and
a contrast-enhancing unit dividing the luminance signal having the enhanced luminance into one or more local areas, and enhancing the contrast of the luminance signal having the enhanced luminance for each local area.

14. A method of enhancing an image, comprising:
separating luminance signals and color signals from input image signals;
enhancing the luminance of the luminance signals;
dividing the luminance signal having the enhanced luminance into one or more local areas; and
enhancing the contrast of the luminance signal having the enhanced luminance for each local area.

15. The method of claim 14, wherein the enhancing of the luminance comprises enhancing the luminance of the luminance signal belonging to a low-luminance area among the luminance signals.

16. The method of claim 14, wherein:
the enhancing of the luminance comprises:
calculating a luminance-correction parameter on the basis of the sum of CDF (cumulative distribution function) values corresponding to luminance values that are set in the low-luminance area; and
enhancing the luminance of the separated luminance signals on the basis of the luminance-correction parameter.

17. The method of claim 14, wherein:
the enhancing of the contrast for each local area comprises:
applying a contrast-enhancing function, which is a linear function, to the luminance signal for each local area; and
applying a smoothing function to the result obtained by the contrast-enhancing function.

18. The method of claim 17, wherein the smoothing function is obtained by performing low pass filtering on a function having only a specific level value for each local area.

19. The method of claim 17, wherein the contrast-enhancing function is composed of a left contrast-enhancing function and a right contrast-enhancing function.

20. The method of claim 14, further comprising:
determining whether the percentage of components belonging to a low-luminance area or a high-luminance area in the input image is higher than a threshold value on the basis of a histogram of the separated luminance signals.

21. The method of claim 14, further comprising:
reducing or removing noise from the input image signal.

22. The method of claim 14, further comprising:
enhancing the resolution of the separated color signals whose luminance and contrast are enhanced.

23. The method of claim 22, wherein the enhancing of the color signal comprises enhancing the resolution of only a saturation signal among the color signals.

* * * * *